(12) United States Patent
Lee

(10) Patent No.: US 7,440,528 B2
(45) Date of Patent: Oct. 21, 2008

(54) TIMING RECOVERY APPARATUS AND METHOD

(75) Inventor: Tae Won Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 505 days.

(21) Appl. No.: 11/002,875

(22) Filed: Dec. 1, 2004

(65) Prior Publication Data
US 2005/0117681 A1   Jun. 2, 2005

(30) Foreign Application Priority Data
Dec. 1, 2003   (KR)   ............... 10-2003-0086338

(51) Int. Cl.
*H04L 7/00* (2006.01)
(52) U.S. Cl. ............... 375/354; 375/376
(58) Field of Classification Search ........... 375/324, 375/327, 355, 373, 375–376; 370/503, 516
See application file for complete search history.

(56) References Cited

U.S. PATENT DOCUMENTS

| | | | | |
|---|---|---|---|---|
| 4,870,660 A | * | 9/1989 | Keate | 375/327 |
| 5,414,741 A | * | 5/1995 | Johnson | 375/376 |
| 5,485,484 A | * | 1/1996 | Williams et al. | 375/376 |
| 5,719,908 A | * | 2/1998 | Greeff et al. | 375/376 |
| 6,154,510 A | * | 11/2000 | Cochran et al. | 375/371 |
| 6,757,024 B2 | * | 6/2004 | Lee | 348/512 |
| 6,819,732 B1 | * | 11/2004 | Savell | 375/377 |
| 6,993,108 B1 | * | 1/2006 | Chi et al. | 375/376 |
| 7,183,863 B1 | * | 2/2007 | Bedrosian | 331/25 |
| 7,245,687 B2 | * | 7/2007 | Chang | 375/376 |

FOREIGN PATENT DOCUMENTS

KR    1020010068618 A    7/2001

* cited by examiner

*Primary Examiner*—Khanh C. Tran
(74) *Attorney, Agent, or Firm*—Lee, Hong, Degerman, Kang & Schmadeka

(57) ABSTRACT

A timing recovery apparatus and method is provided. The apparatus includes: a symbol synchronizer for determining a bandwidth of a timing recovery loop by a lock step control signal, which is outputted depending on a convergence degree; a timing lock detector for judging the convergence degree to generate the lock step control signal; and a timing deviation detector for receiving a timing frequency signal outputted from the symbol synchronizer to detect the timing deviation.

43 Claims, 16 Drawing Sheets

TIMING RECOVERY APPARATUS AND METHOD

CROSS-REFERENCE TO RELATED APPLICATIONS

Pursuant to 35 U.S.C. § 119(a), this application claims the benefit of earlier filing date and right of priority to Korean Application No. 10-2003-0086338, filed on Dec. 1, 2003, the contents of which are hereby incorporated by reference herein in their entirety.

BACKGROUND OF THE INVENTION

1. Field of the Invention

The present invention relates to a timing recovery, and more particularly, to a timing recovery apparatus and method for detecting a timing lock and deviation for a timing recovery of a digital broadcasting receiver.

2. Discussion of the Related Art

Generally, since a symbol synchronization block of a Quadrature Amplitude Modulation (QAM) receiver, which is selected as a transmission standard of a digital TV cable channel, generates a clock of a symbol string, it is called a clock synchronizer or clock generator.

An object of symbol synchronization is to right and accurately estimate a symbol transition time in a receiver on the basis of received data string.

Accordingly, the symbol synchronization is necessarily required for a demodulation process of a digital communication, and employs a lock detector to obtain better convergence characteristic.

A function of the symbol synchronizer having the lock detector is described as follows.

FIG. 1 is a block diagram illustrating a construction of a general Quadrature Amplitude Modulation (QAM) demodulator having the lock detector.

As shown in FIG. 1, the QAM demodulator includes a multiplier 1 for multiplying an input signal by a predetermined frequency signal outputted from a Numerically Controlled Oscillator (NCO) 5, to output a baseband signal; a resampler 2 for receiving and sampling the baseband signal outputted from the multiplier 1; a baseband signal processor 3 for receiving the signal from the resampler 2 to perform a signal process such as decoding; a carrier synchronizer and channel equalizer 4 for performing a distortion compensation of the signal outputted from the baseband signal processor 3; a numerically controlled oscillator 5 for outputting a signal having a frequency for obtaining an accurate baseband signal by an error detected in the carrier synchronizer and channel equalizer 4; a symbol synchronizer for rightly estimating a symbol transition time at the signal of the baseband signal processor 3; and the lock detector 7 for detecting a convergence state of the symbol synchronizer 6 to control a bandwidth.

Here, the symbol synchronizer 6 is disposed at a front of the carrier synchronizer and channel equalizer 4 to transmit synchronized symbol data to the carrier synchronizer and channel equalizer 4.

Accordingly, the convergence characteristic of the symbol synchronization has influence on the convergence characteristic of the carrier synchronizer and channel equalizer 4.

Therefore, the convergence characteristic of the symbol synchronizer 6 requires a fast initial synchronization capture and a weak jitter characteristic of a normal state.

For the fast synchronization capture, a symbol synchronization loop (timing recovery loop) should have a wide loop bandwidth. For obtaining the weak jitter characteristic at the normal state, the symbol synchronization loop should have a narrow loop bandwidth.

For obtaining the above convergence characteristic, the synchronization is initially captured at the wide loop band, and when the convergence is made at the normal state, the lock detector 7 is used to gradually narrow the loop bandwidth (called "gear shifting").

Further, in order to obtain the convergence characteristic of a more fast and accurate receiver convergence characteristic in association with the carrier synchronizer and channel equalizer 4, information on the convergence state of the symbol synchronization loop is required.

Accordingly, the lock detector 7 is essential for improving and stabilizing a performance of the receiver, and the lock detector 7 necessarily requires a function of accurate detection.

A conventional lock detecting algorithm and construction of the lock detector is described with reference to FIG. 2 as follows.

FIG. 2 is a block diagram illustrating a conventional timing lock detector.

As shown in FIG. 2, the baseband signal inputted to the symbol synchronizer 6 is inputted to a Timing Error Detector (TED) 61 included in the symbol synchronizer 6.

In a Quadrature Phase Shift Keying (QPSK) or a Quadrature Amplitude Modulation (QAM) system, the timing error detector 61 of the symbol synchronizer 6 calculates an error from the baseband signal since a timing frequency and phase offset is generated while the baseband signal passes through a channel of an analogue unit of a transceiver.

The calculated error is accumulated in an integrator (not shown) of a loop filter 63 to control a Number Controlled Oscillator (NCO) or a Voltage Controlled Oscillator (VCO) 65, thereby recovering the symbol synchronization.

At this time, since the loop bandwidth of a closed loop comprised of the resampler 2 and the symbol synchronizer 6 is proportional to a gain of the closed loop, the gain of the closed loop is stepwise controlled by using the timing lock detector 7, to control the loop bandwidth.

The timing lock detector 7 of FIG. 2 is connected to the loop filter 63 to obtain a variance of an error value (X) accumulated in the integrator of the loop filter 63 so that the obtained variance is compared with a fixed threshold value in a comparator 71 to judge a lock time.

The lock signal is transmitted to the lock controller 73 to allow the selection of the loop bandwidth of the closed loop.

FIG. 3 is a view illustrating a principle of a conventional lock detector. FIG. 3A illustrates a convergence curve for a timing offset, and FIG. 3B illustrates a variance of a convergence curve for the timing offset.

Referring to FIG. 3A, after the convergence of a reference timing offset frequency, a magnitude of a remaining jitter gets different depending on a channel state (SNR) at the normal state.

Referring to FIG. 3B, the error value (X) accumulated in the integrator of the loop filter is converged depending on the channel state (SNR), the variance of the error value (X) is also varied due to the remaining jitter characteristic inversely proportion to the channel state at the normal state. The variance (Variance X) of the error value (X) is obtained in $E[X^2]-E[X]^2$.

Accordingly, the conventional lock detector has a drawback in that a hardware cost is very much paid for the variance calculation, and since the variance is different depending on the channel state after the convergence, the fixed threshold value generates an erroneous lock signal, thereby causing a lock error.

The above lock error does not only extend a convergence time, but also makes it impossible to perform the convergence for a large timing frequency and phase offset.

Of course, an appropriate threshold value is obtained by using a SNR calculator, but there is a drawback in that the convergence time of the symbol synchronizer is lengthened as long as a calculation time of the SNR calculator to make it possible to provide a weak remain characteristic, but to make it impossible to provide the convergence characteristic of the fast synchronization capture, thereby preventing the lock detector from performing its function in orderly fashion.

Further, the conventional timing lock detector, which accumulates and processes a spontaneous symbol error for a predetermined duration, has a drawback in that at the time of the existence of a symbol timing deviation, the timing deviation is minutely generated for a duration larger than the process duration of the timing lock detector, thereby making it impossible to detect the timing deviation.

At this time, a method of increasing the process duration of the conventional timing lock detector can be considered, but it has a drawback in that the delay of the lock judgment is caused to decrease a convergence speed of the receiver.

SUMMARY OF THE INVENTION

Accordingly, the present invention is directed to a timing recovery apparatus and method that substantially obviate one or more problems due to limitations and disadvantages of the related art.

An object of the present invention is to provide a timing recovery apparatus and method for preventing a lock error and obtaining a characteristic of fast and accurate convergence.

Another object of the present invention is to provide a timing recovery apparatus and method for optimizing a symbol recovery performance of a receiver by automatically selecting a final gain of a timing error depending on the existence or absence of a timing deviation.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a timing recovery apparatus including: a symbol synchronizer for determining a bandwidth of a timing recovery loop by a lock step control signal, which is outputted depending on a convergence degree; a timing lock detector for judging the convergence degree to generate the lock step control signal; and a timing deviation detector for receiving a timing frequency signal outputted from the symbol synchronizer to detect the timing deviation.

The symbol synchronizer includes: a timing error detector for receiving a reception signal to detect a timing error; a gain selector for receiving the timing error value and the lock step control signal to determine a timing recovery loop bandwidth; a loop filter for accumulating and correcting the detected error value depending on the determined bandwidth; and an oscillator for outputting a sampling frequency depending on the corrected value.

The timing lock detector includes: an average DC (Direct Current) power calculator for calculating an average DC power of the timing error value; a unit jitter power calculator for calculating a unit jitter power of the timing error value; a lock/unlock count signal generator for comparing the average DC power with the unit jitter power to generate a lock/unlock count signal; a reliability counter for receiving the lock/unlock count signal to count up to each threshold value, thereby generating a lock/unlock signal; and a lock controller for generating the lock step control signal by using the lock/unlock signal.

The reliability counter includes: a counter for increasing or decreasing a count value depending on the lock/unlock count signal; and a comparator for comparing the count value increasing or decreasing through the counter, with each threshold value.

The reliability counter performs a gear shifting depending on the lock/unlock count signal.

The lock controller has a lock step as much as a gain step of the gain selector, and comprises a lock state counter for increasing or decreasing the lock step depending on the inputted lock/unlock signal.

The timing lock detector further comprises a channel state estimator for estimating a channel state to, if the estimated channel state is more than a preset channel state, generate a channel state condition satisfaction signal.

The timing deviation detector includes: a timing deviation detector for obtaining a deviation of a maximum value and a minimum value of a timing frequency outputted from the symbol synchronizer; a threshold selector for providing a preset threshold value; a comparing judgment compartment for comparing the obtained timing deviation value with the threshold value to generate a timing deviation index signal; and a last timing lock step selector for selecting the final lock step signal depending on the timing deviation index signal.

In another aspect of the present invention, there is provided a timing recovery method including the steps of: detecting a timing error of a reception signal and judging a convergence degree depending on the detected timing error to generate a lock step control signal; determining a bandwidth of a timing recovery loop depending on the lock step control signal; and receiving a timing frequency signal depending on the determined bandwidth to detect a timing deviation and controlling the lock step depending on the existence or absence of the detected timing deviation.

The generating of the lock step control signal includes: calculating an average DC (Direct Current) power of the timing error value; calculating a unit jitter power of the timing error value; comparing the average DC power with the unit jitter power to generate a lock/unlock count signal; receiving the lock/unlock count signal to count up to each threshold value, thereby generating a lock/unlock signal; and generating the lock step control signal through the lock/unlock signal.

The determining of the timing recovery loop depending on the lock step control signal includes: receiving a timing error value in a plurality of steps to multiply the received error value by a gain depending on each of the steps; and selecting one of loop gains of the gain setting unit by the lock step control signal.

The detecting of the timing deviation includes: obtaining a deviation of a maximum value and a minimum value of a timing frequency; comparing the deviation value with the threshold value to generate a timing deviation index signal; and selecting the final lock step signal depending on the timing deviation index signal.

Accordingly, the present invention has an effect in that the lock detecting error is prevented and the faster and accurate convergence characteristic is obtained, and the optimal final gain of the timing error is automatically selected depending on the existence or absence of the timing deviation, thereby optimizing the symbol recovery performance of the whole receiver.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
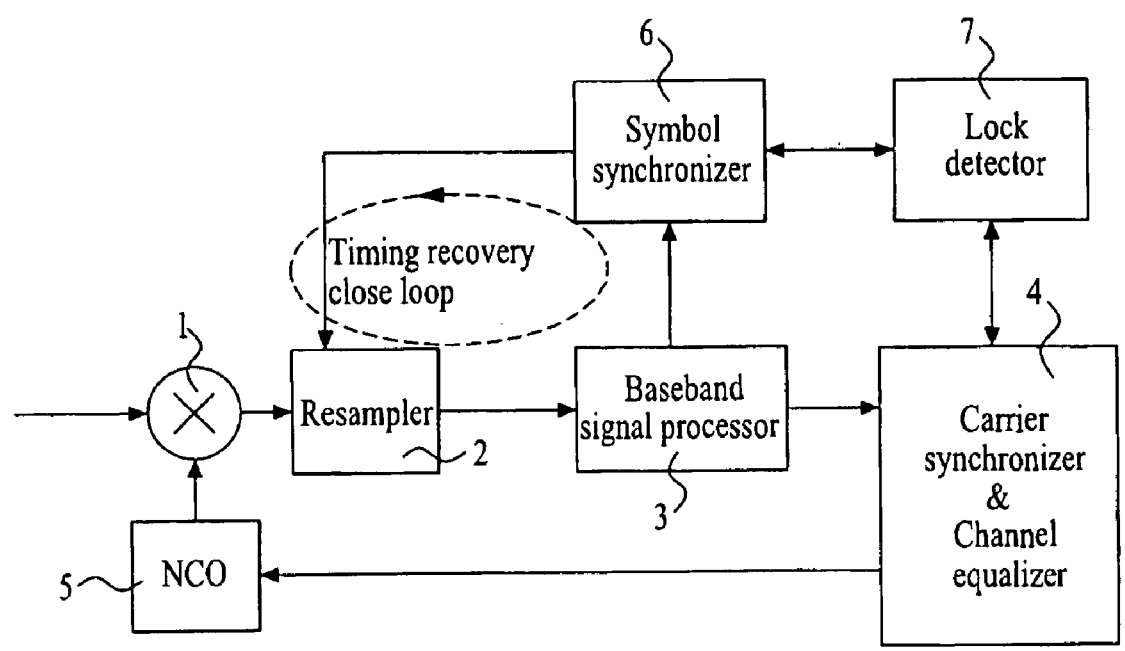
FIG. 1 is a block diagram illustrating a construction of a general Quadrature Amplitude Modulation (QAM) demodulator having a lock detector.
Figure 2:
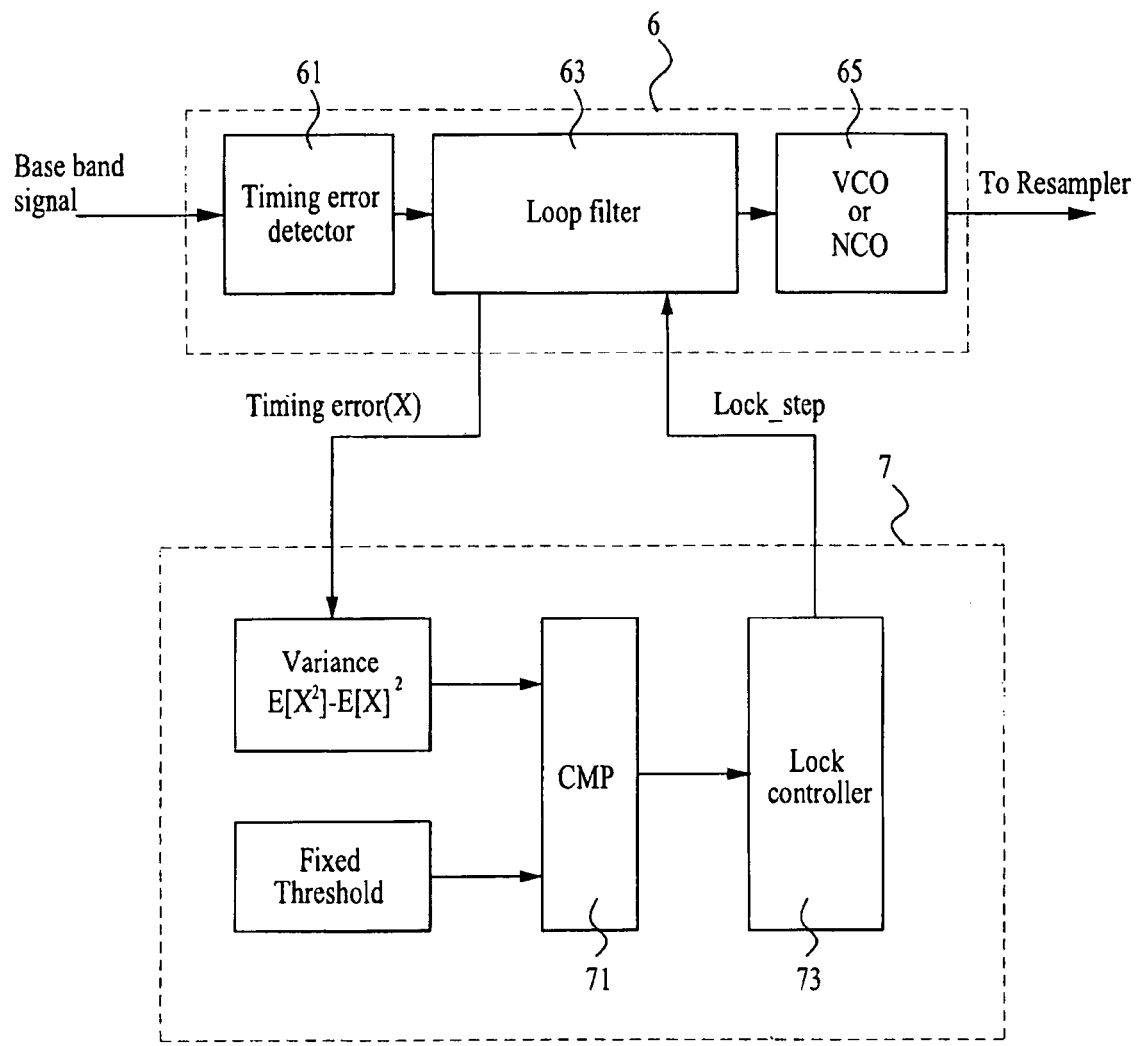
FIG. 2 is a block diagram illustrating a conventional timing lock detector.
Figure 3A:
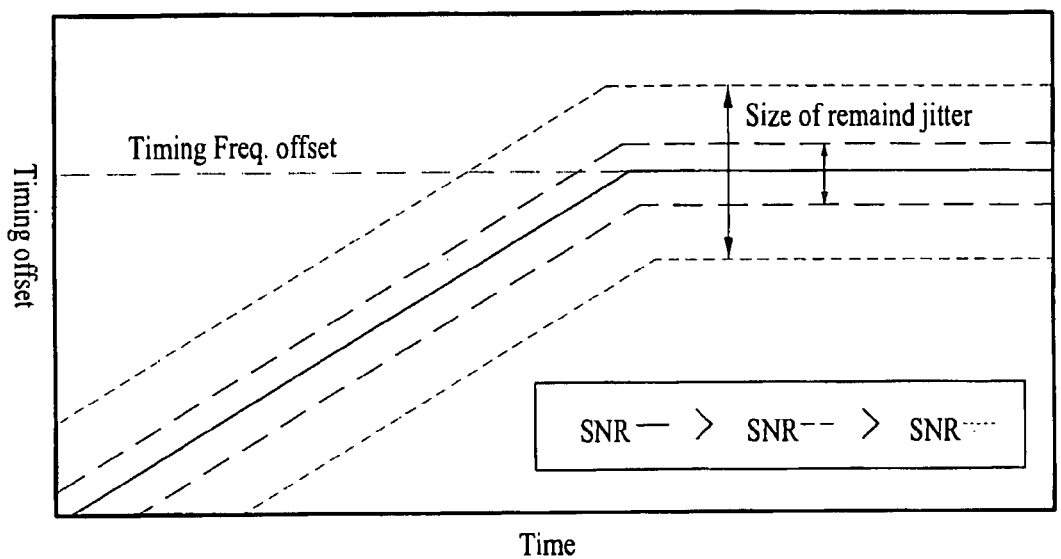
FIGS. 3A and 3B are views illustrating a conventional lock detection principle.
Figure 3B:
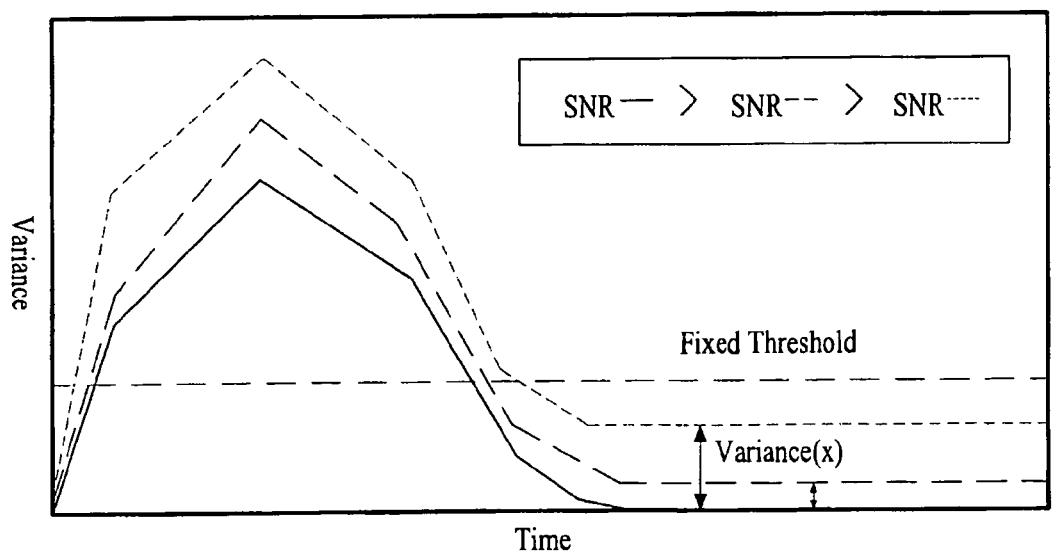
Figure 4:
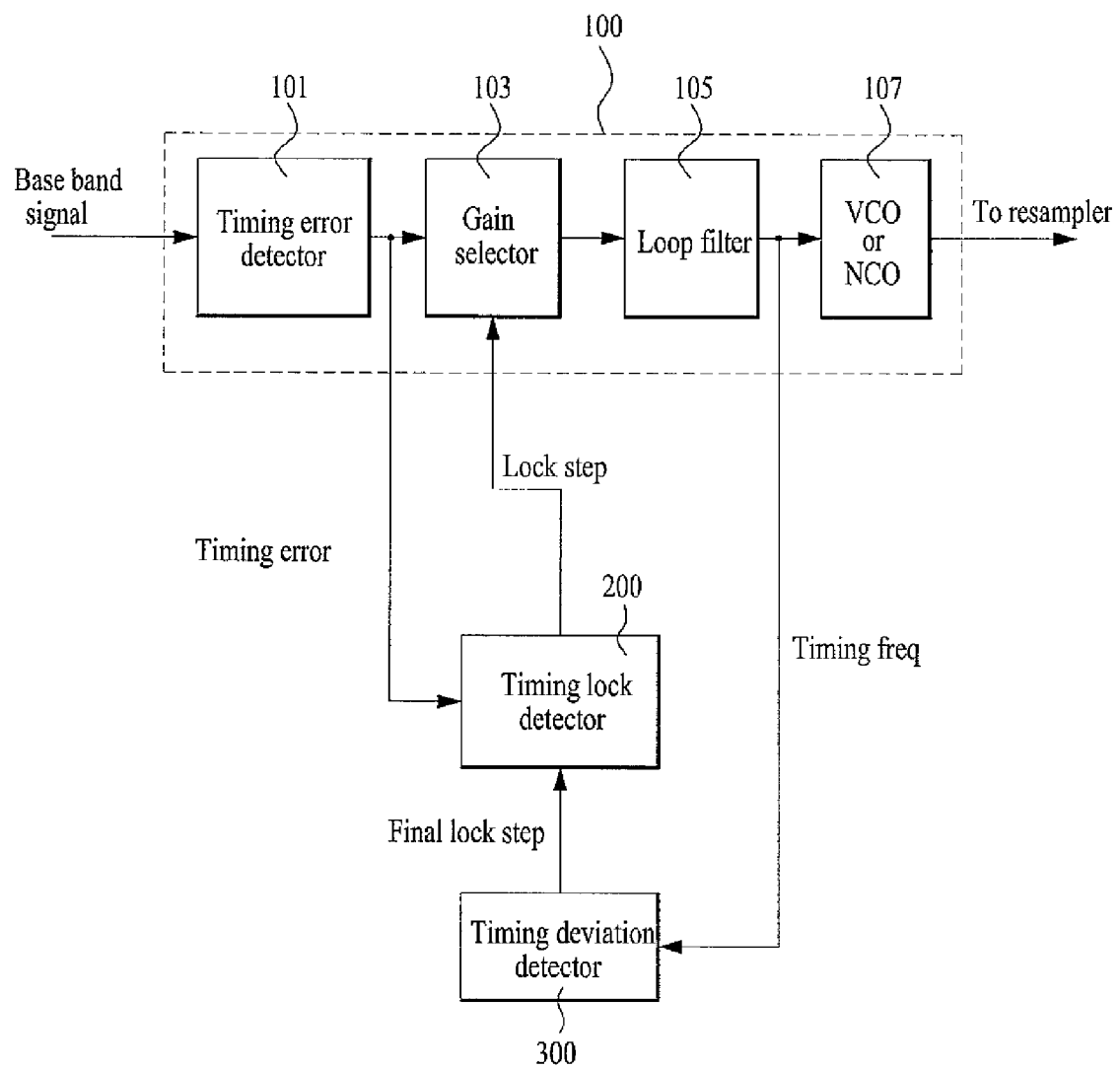
FIG. 4 is a block diagram illustrating a timing recovery apparatus having a timing lock detector and a timing deviation detector according to the present invention.

FIG. 4 is a block diagram illustrating a timing recovery apparatus having a timing lock detector and a timing deviation detector according to the present invention.

As shown in FIG. 4, the inventive timing recovery apparatus includes a symbol synchronizer 100 for determining a bandwidth of a timing recovery loop in a plurality of steps by a lock control signal outputted depending on a convergence degree; a timing lock detector 200 for judging the convergence degree to output the lock control signal; and a timing deviation detector 300 for detecting a timing deviation, which can be generated in the timing recovery process.

The symbol synchronizer 100 includes a timing error detector 101 for receiving a baseband signal to detect a timing error; a gain selector 103 for receiving the detected timing error value to select a loop gain depending on each of steps, thereby determining a timing recovery loop bandwidth; a loop filter 105 for accumulating the detected error value depending on the determined bandwidth to correct the accumulated error; and a Voltage Controlled Oscillator (VCO) or a Numerically Controlled Oscillator (NCO) 107 for outputting a sampling frequency depending on a corrected value outputted form the loop filter 105.

In the above-constructed timing recovery apparatus, the timing lock detector 200 calculates lock information from an output signal of the timing error detector 101 to generate the lock control signal. The lock control signal is used to select a gain of the timing error detector 101, thereby controlling the loop bandwidth so that the symbol synchronizer 100 can have a fast and accurate convergence characteristic.

A construction and an operation of the timing lock detector 200 for the above operation are in more detail described with reference to the attached drawings.

Figure 5:
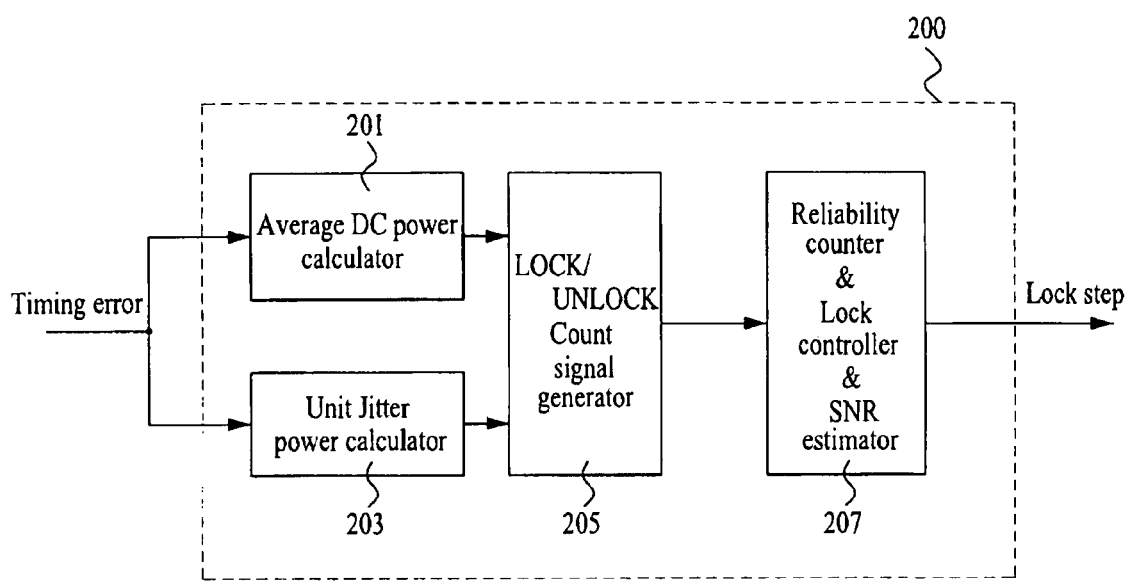
FIG. 5 is a block diagram illustrating a timing lock detector according to the present invention.

FIG. 5 is a block diagram illustrating a timing lock detector according to the present invention.

As shown in FIG. 5, the timing lock detector 200 includes an average DC power calculator 201 for calculating an average Direct Current (DC) power through a power of a timing error component detected in an ideal symbol of the timing error signal; a unit jitter power calculator 203 for calculating a unit jitter power from an Alternating Current (AC) component of the timing error signal; a lock/unlock count signal generator 205 for comparing the average DC power with the unit jitter power to generate a lock/unlock count signal; a reliability counter, lock controller and channel state estimator 207 comprised of a reliability counter and lock controller for receiving the lock/unlock count signal to count up to each of threshold levels, thereby outputting a lock or unlock signal, and a channel state estimator for transmitting a channel state (SNR) condition satisfaction signal to the lock controller.

A lock detecting process of the timing lock detector 200 is described as follows.

A component of the timing error signal detected through the timing error detector 101 can be mainly distinguished into a timing error component detected in an ideal symbol, and a jitter component caused by a white noise added to the symbol.

Observing the timing error signal from a frequency domain, the power of the timing error component detected in the ideal symbol can be regarded as an average DC power of the timing error, and the jitter component caused by the white noise added to the symbol can be regarded as the white noise of the AC component of the timing error.

According to the present invention, an average power is detected from the timing error to be used as lock information of the timing recovery loop. This is described with reference to the attached drawings as follows.

Figure 6A:
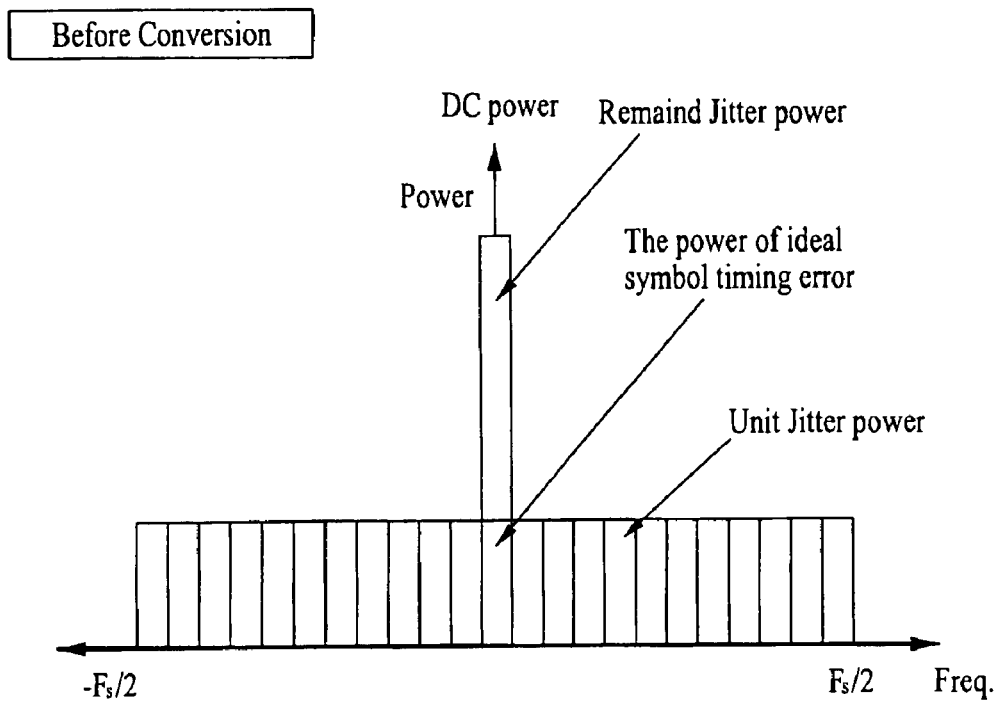
FIGS. 6A and 6B are views illustrating an operation principle of a timing lock detector according to the present invention.
Figure 6B:
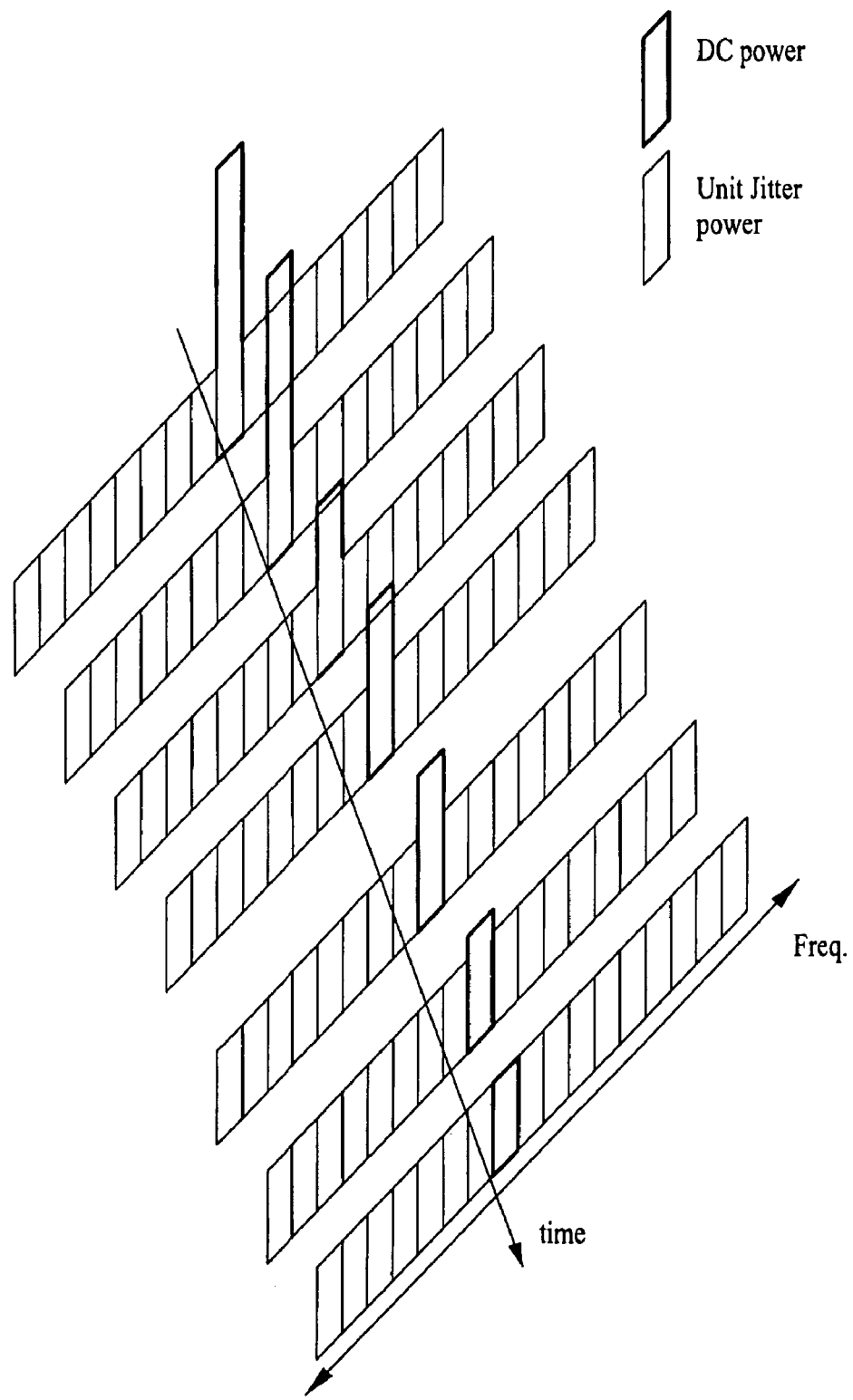

FIGS. 6A and 6B are views illustrating an operation principle of the timing lock detector according to the present invention.

First, FIG. 6A illustrates a power component in the frequency domain before convergence. As shown in FIG. 6A, the power is distinguished into a remaining jitter power, a power of an ideal symbol timing error component, and a unit jitter power in the frequency domain.

The summation of the remaining jitter power and the power of the ideal symbol timing error component is the average DC power, and the unit jitter power is the white noise of the AC component of the timing error.

The average DC power is reduced as a convergence time of the timing recovery loop goes as in FIG. 6B.

Figure 6C:
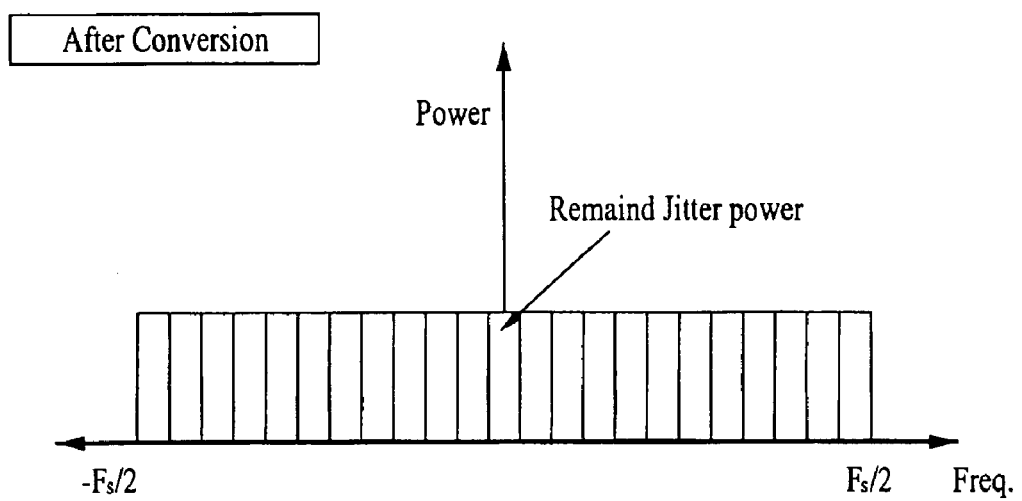

As a result, if the final convergence is completed, the average DC power component has only the remaining jitter component as shown in FIG. 6C.

Accordingly, the unit jitter power is obtained from the AC component of the timing error so as to predict a magnitude of the remaining jitter component. The unit jitter power is compared with the average DC power value to generate a lock/unlock signal. This is illustrated in FIG. 7.

Figure 7:
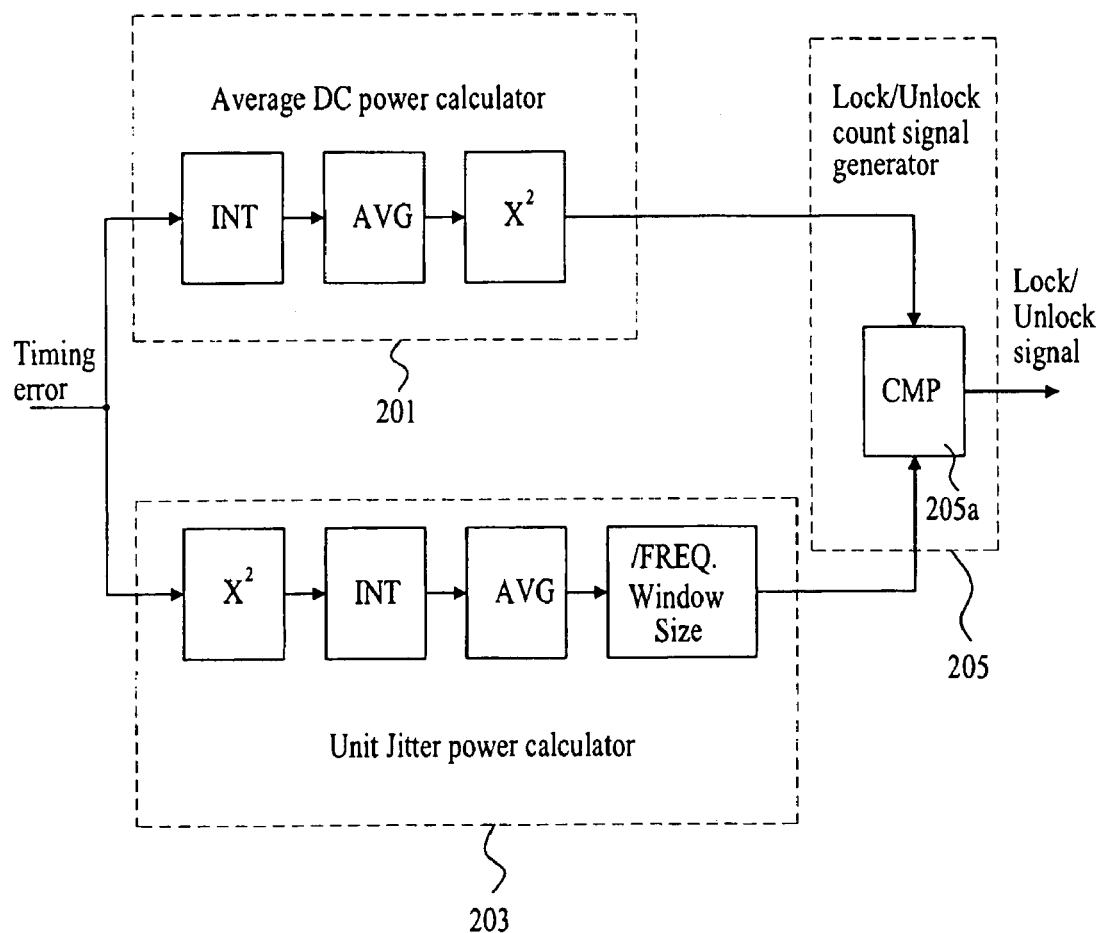
FIG. 7 is a block diagram illustrating a detailed partial construction of a timing lock detector according to the present invention.

FIG. 7 is a block diagram illustrating a detailed partial construction of a timing lock detector according to the present invention.

As shown in FIG. 7, the unit jitter power calculator 203 obtains a square value of the timing error generated at each of symbols and accumulates the obtained square values for an integral duration, and divides the accumulated square value by a magnitude of the integral duration to obtain the average jitter power.

The average jitter power is again divided by the number of samples to calculate the unit jitter power. The unit jitter power is inputted to the comparator 205a of the lock/unlock count signal generator 205.

Further, the average DC power calculator 201 accumulates the timing error generated at each of symbols for the integral duration, and then divides the accumulated timing errors by the magnitude of the integral duration to obtain an average DC value. The average DC value is squared to calculate the average DC power, and the calculated power is inputted to the comparator 205a of the lock/unlock count signal generator 205.

The lock/unlock count signal generator 205 compares the unit jitter power value and the average DC power value to generate a lock count signal '0' if the unit jitter power value is more than or the same as the average DC power value, and to generate an unlock count signal '1' if the unit jitter power value is less than the average DC power value.

The reliability counter accumulates the generated lock/unlock count signal to determine a lock/unlock of a timing recovery unit. This is described with reference to FIG. 8 as follows.

Figure 8:
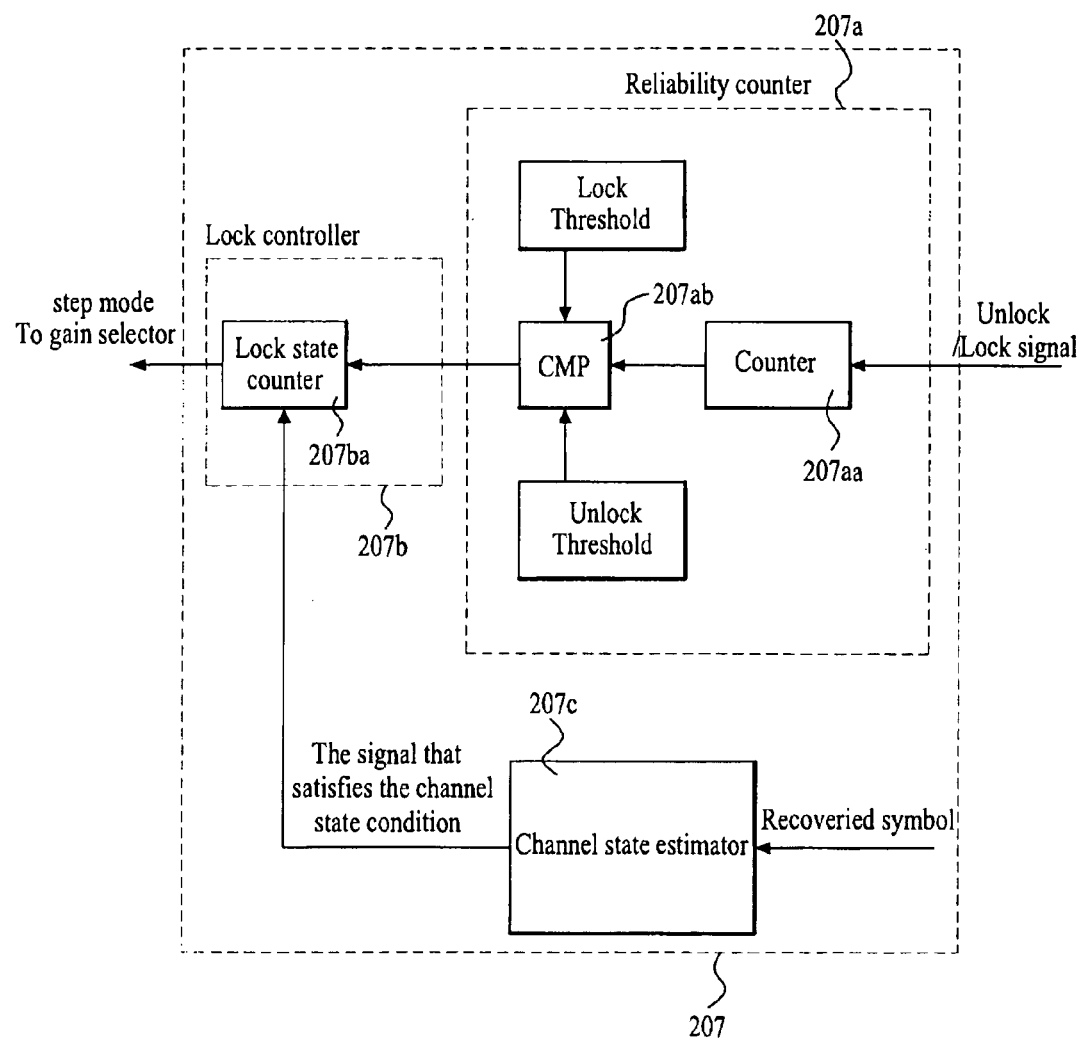
FIG. 8 is a block diagram illustrating a detailed construction of a lock controller and reliability counter having a channel state estimator of a timing lock detector according to the present invention.

FIG. 8 is a block diagram illustrating a detailed construction of the lock controller and reliability counter having the channel state estimator of the timing lock detector according to the present invention.

As shown in FIG. 8, the reliability counter 207a includes a counter 207aa for increasing or decreasing a count value depending on the lock/unlock count signal; a comparator (CMP) 207ab for comparing the count value increased or decreased through the counter 207aa with each of the threshold values. Further, the reliability counter 207a has a memory for storing a preset and inputted lock threshold value and an unlock threshold value.

Describing an operation of the above-described reliability counter 207a, the lock/unlock count signal generated at the lock/unlock count signal generator 205 is inputted to the counter 207aa of the reliability counter 207a.

In case where the lock count signal '0' is inputted to the counter 207aa, the lock count signal '0' is counted to increase the count value by 1. The increased count value is compared with the lock threshold value through the comparator 207ab. As a compared result, if the increased count value is the same or more than the lock threshold value, the lock signal is generated and the counter 207aa is reset.

The reset counter 207aa repeats a process of increasing (+1) and resetting the count value depending on the lock count signal '0'. This is to perform a gear shifting for obtaining a little less jitter characteristic in a normal state since the lock controller 207a, which receives the lock signal, generates a lock step control signal increasing the step, thereby causing the narrowing of the loop bandwidth selected at the loop gain selector 103.

Further, in case where the unlock count signal '1' is inputted to the counter 207aa, the counter 207aa counts the unlock count signal '1' to decrease the count value by 1. The decreased count value is compared with the unlock threshold value through the comparator 207ab. As a comparative result, if the decreased count value is less than or the same as the unlock threshold value, an unlock signal is generated and the counter 207aa is reset.

In the same manner, the reset counter 207aa repeats a process of decreasing and resetting the count value depending on the unlock count signal '1'. This is to perform a faster initial synchronization capture since the lock controller 207b, which receives the lock signal, generates a lock step control signal decreasing the step, thereby causing the widening of the loop bandwidth selected at the loop gain selector 103.

The above process is in more detail described with reference to the drawings in the following.

Figure 9A:
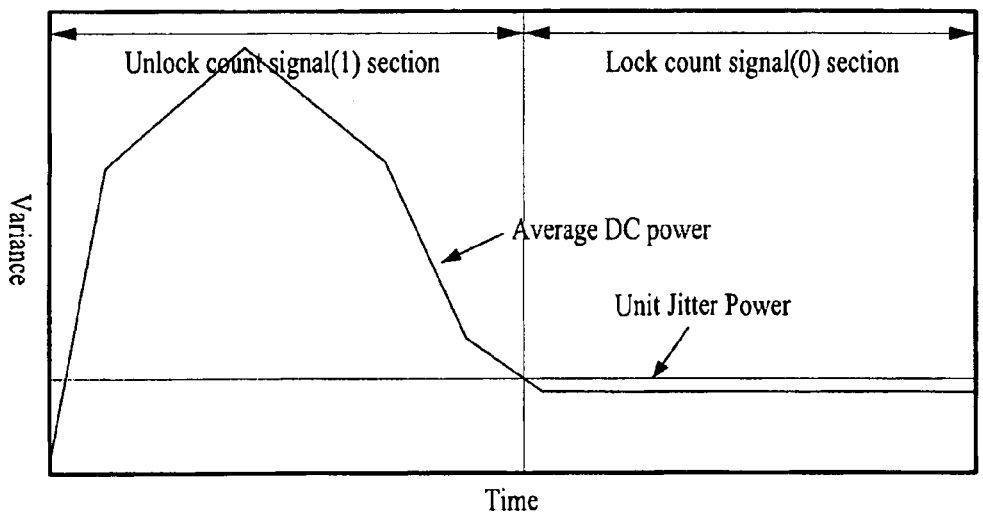
FIGS. 9A and 9B are views illustrating an operation relation of a lock/unlock count signal and a reliability counter according to the present invention.
Figure 9B:
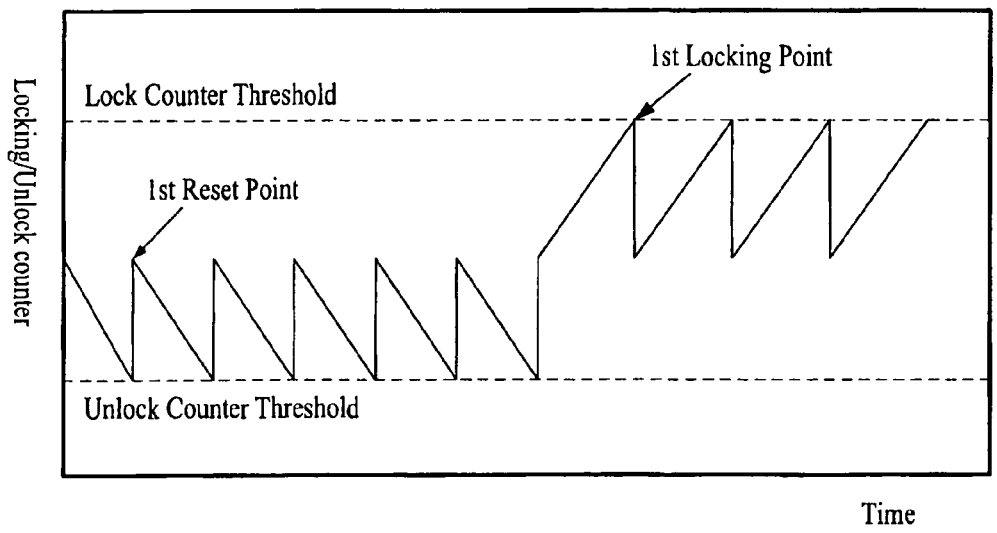

FIGS. 9A and 9B are views illustrating the operation relation of the lock/unlock count signal and the reliability counter according to the present invention.

First, FIG. 9A is a view illustrating a variance value of a convergence curve with respect to a timing offset according to the present invention.

As shown in FIG. 9A, lock/unlock count signal sections are divided depending on the average DC power component and the unit jitter power.

In other words, a section at which the average DC power depending on a specific channel state (SNR) is larger than the unit jitter power is an unlock count signal '1.' section, and a section at which the average DC power is less than or the same as the unit jitter power is a lock count signal '0' section.

FIG. 9B illustrates a signal flow of the reliability counter with respect to the lock/unlock count signal.

As shown in FIG. 9B, in case of the unlock count signal, the count value is decreased by −1 at an initial zero, and if the decreased count value is the same as or less than the unlock counter threshold value, the count value is reset. This process is repeated to widen the loop bandwidth as described above.

As described above, if the average DC power becomes less than or the same as the unit jitter power while the loop bandwidth is widened every step, the lock count signal is obtained to increase the count value by 1. If the increased count value is the same as or more than the lock counter threshold value, it is again reset. This process is repeated to narrow the loop bandwidth.

As such, if the lock/unlock signal is generated depending on the lock/unlock count signal, the signal is inputted to a lock state counter 207ba of the lock controller 207b of FIG. 8.

The lock controller 207b has a lock step as many as a gain step of the gain selector 103. That is, the lock step is increased or decreased depending on the lock/unlock signal. This is described with reference to FIG. 10 in the following.

Figure 10:
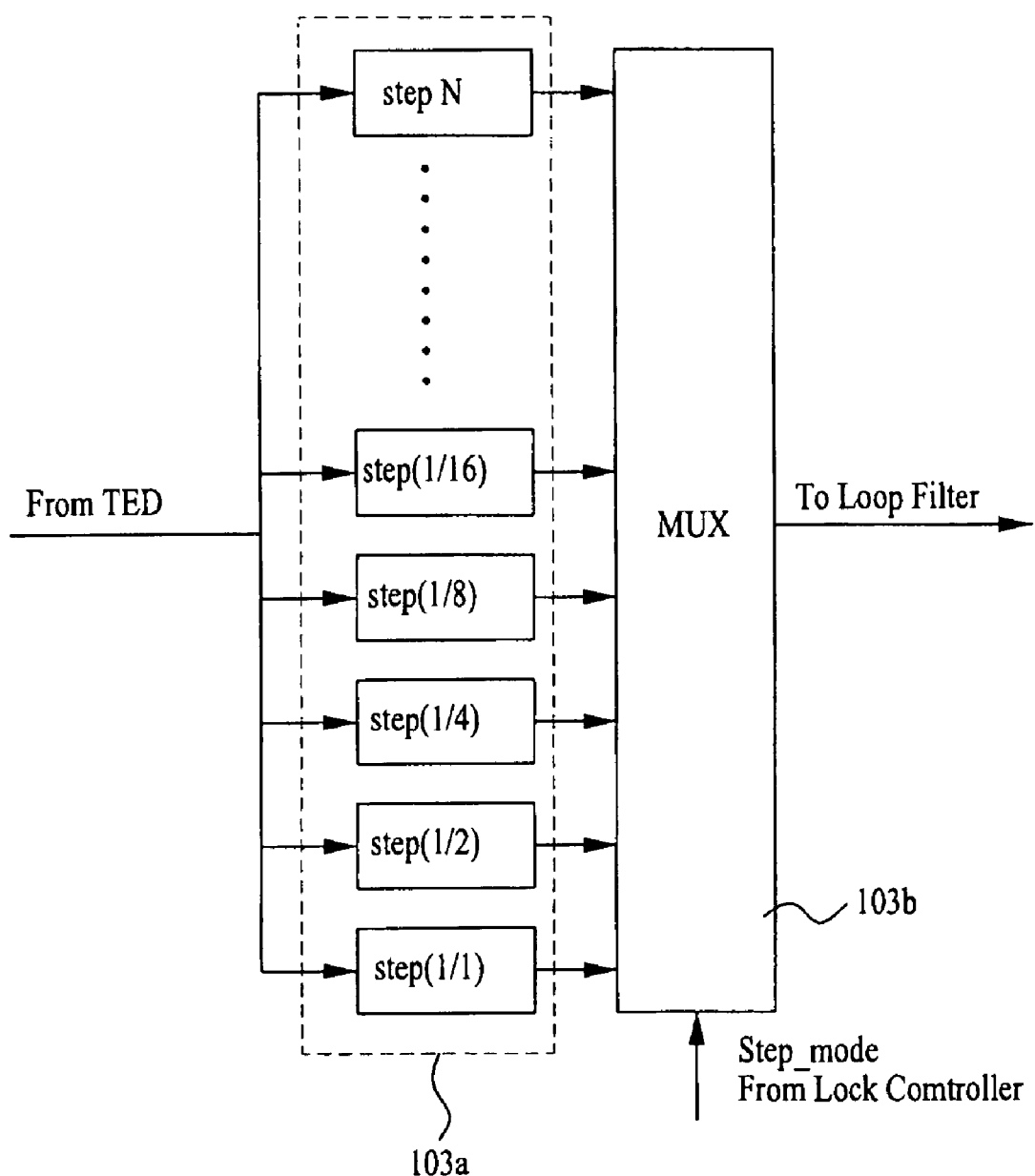
FIG. 10 is a block diagram illustrating a construction of a loop gain selector according to the present invention.

FIG. 10 is a block diagram illustrating a construction of the loop gain selector according to the present invention.

As shown in FIG. 10, the loop gain selector 103 includes a gain setting unit 103a for receiving the timing error signal from the timing error detector 101 to multiply the received error signal by a gain depending on each of the steps; and a multiplexer (MUX) 103b for selecting an appropriate loop gain among values of the gain setting unit 103a by the lock step control signal (step mode) outputted from the lock controller 207b.

In other words, if the lock step is selected through the lock state counter 207ba of the lock controller 207b and inputted to the loop gain selector 103, the loop gain selector 103 multiplies the inputted lock step by the gain depending on the step to determine the loop bandwidth.

Further, according to the present invention, the channel state (SNR) estimator is also provided for a faster and higher reliable lock process.

In other words, the channel state estimator 207c of FIG. 9 is added for the faster and higher reliable lock process. The channel state estimator 207c obtains a Mean Square Error (MSE) from symbol data to estimate a channel state (SNR). If the channel state is estimated to be more than a predetermined channel state value, the channel state estimator 207c transmits the channel state condition satisfaction signal, which indicates that a channel state condition is satisfied, to the lock controller 207b.

The lock controller 207b receives the channel state condition satisfaction signal from the channel state estimator to generate the lock step control signal for allowing a condition shift to the final lock step, to thereby perform the faster and higher reliable lock process.

As described above, if the lock is detected to determine the bandwidth depending on the convergence state, the error values detected depending on the bandwidth are accumulated in the loop filter 105, and the accumulated error values are corrected. According to the corrected value, the oscillator 107 outputs the sampling frequency, and a resampler receiving the sampling frequency performs the sampling.

Meanwhile, according to the present invention, as described above, the timing deviation detector 300 is provided for preparation of the case where the symbol deviation is generated. The timing deviation detector 300 is used to determine a final value of the timing error gain depending on the existence or absence of the timing deviation, thereby outputting the determined final value to the timing lock detector 200. Accordingly, the lock step is controlled through the lock control signal of the timing lock detector 200.

A structure and a detailed operation of the timing deviation detector 300 are described with reference to the attached drawings in the following.

Figure 11:
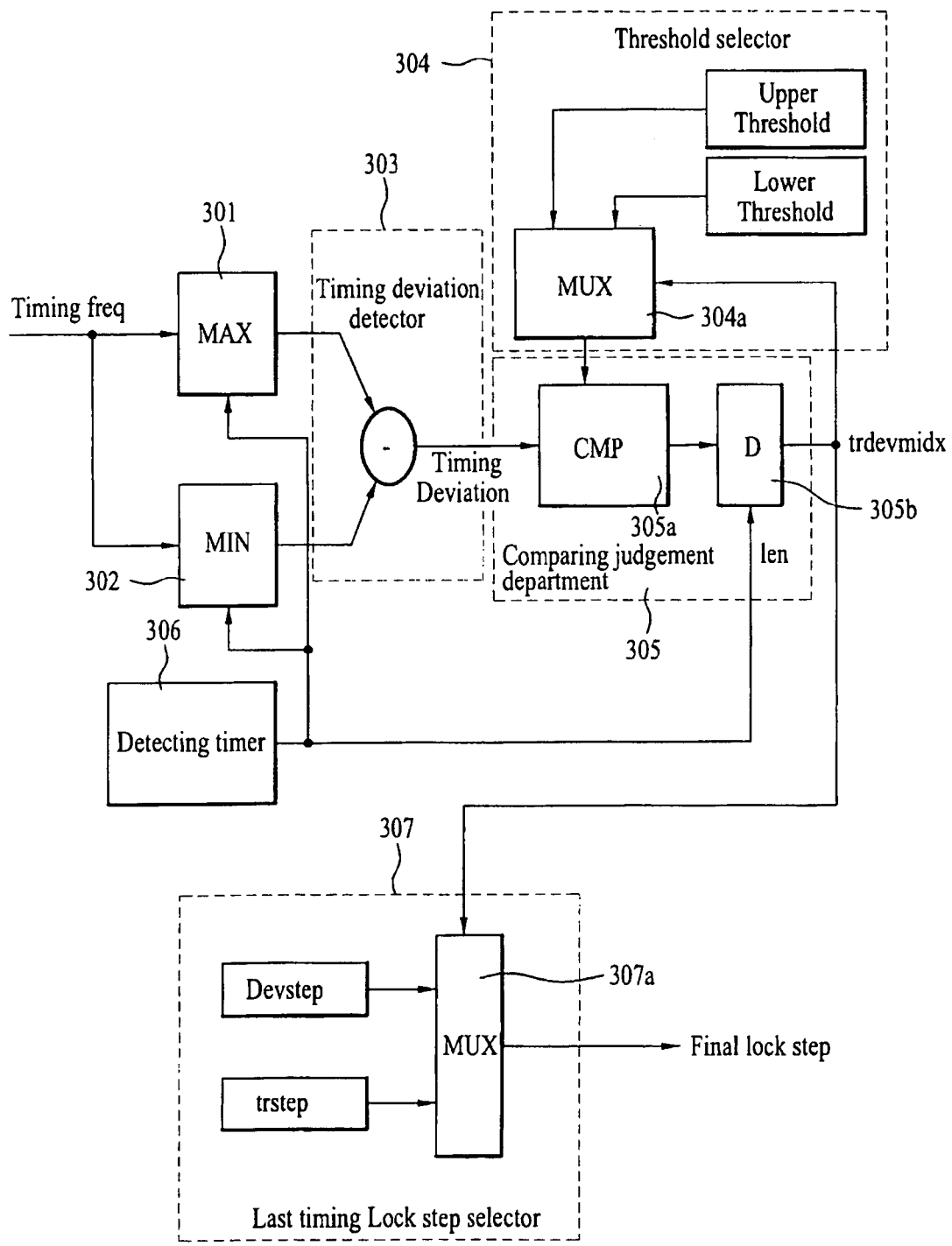
FIG. 11 is a block diagram illustrating a detailed construction of a timing deviation detector according to the present invention.

FIG. 11 is a block diagram illustrating a detailed construction of the timing deviation detector according to the present invention.

As shown in FIG. 11, the timing deviation detector includes a maximum value storing unit 301 for storing a maximum value and a minimum value storing unit 302 for storing a minimum value for the detecting time of an inputted symbol timing information; a timing deviation detector 303 for obtaining a difference between the stored maximum value and minimum value, that is, a spontaneous timing deviation value; a comparing judgment department 305 for comparing the timing deviation value with the threshold value to judge the existence or absence of the timing deviation; a threshold selector 304 for selecting one of an upper threshold and a lower threshold depending on the existence or absence of the timing deviation; a last timing lock step selector 307 for selecting DEVSTEP (existence of timing deviation) or TRSTEP (absence of timing deviation) depending on the existence or absence of the timing deviation; a detecting timer 306 for providing while gradually increasing the detecting time for which the timing deviation is detected.

An operation of the timing deviation detector 300 is described as follows.

First, among the symbol timing frequency outputted from the loop filter 105, the maximum value is stored in the maximum value storing unit 301 and the minimum value is stored in the minimum value storing unit 302 for the detecting time provided by the detecting timer 306. A difference between the stored maximum value and minimum value is obtained through the timing deviation detector 303 to be inputted to the comparator 305a of the comparing judgment compartment 305.

The difference inputted to the comparator 305a is compared with the threshold value previously stored in the memory of the threshold selector 304, to transmit a timing deviation index signal (trdevmidx), which indicates that the timing deviation is generated, through a delay 305b in case where the difference has a larger deviation than the threshold value. The delay 305b receives detecting time information (len) from the detecting timer 306 to delay the timing deviation signal during the one duration.

At this time, the threshold value is selected from the upper threshold value or the lower threshold value previously stored in the memory depending on the existence or absence of the timing deviation.

In other words, in case where the initial synchronization capture is not performed at the first time, the upper threshold value is applied to detect the timing deviation. After the synchronization capture is performed by the lock step selected depending on the existence or absence of the timing deviation, the lower threshold value is applied to enhance a reliability and a stability of the timing deviation detector 300.

This is in more detail described with reference to the attached drawings as follows.

Figure 12:
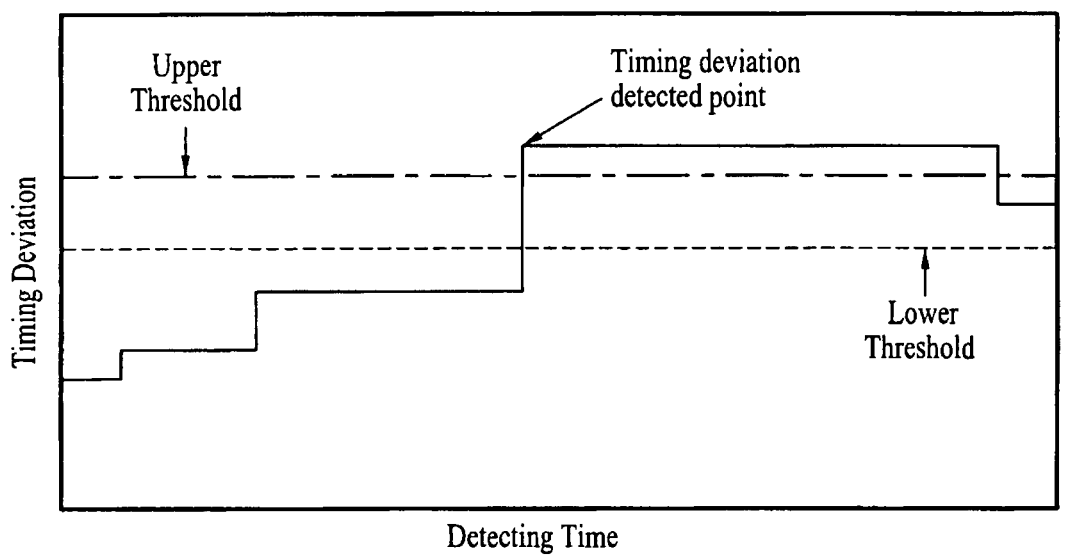
FIG. 12 is a view illustrating a relation between a detecting time and a timing deviation, and a threshold value.

FIG. 12 is a view illustrating a relation between the detecting time and the timing deviation, and the threshold value.

As shown in FIG. 12, while the detecting time is increased depending on the control of the detecting timer 306, the timing deviation is detected. As the detecting time is increased, a probability of detecting the timing deviation is increased as much. Therefore, when the timing deviation gradually increasing (not necessarily increasing) is larger than the upper threshold value, the timing deviation is generated under the control of the comparing judgment compartment 305, and the timing deviation index signal is transmitted.

The timing deviation index signal generated as described above is inputted to the last timing lock step selector 307.

The last timing lock step selector 307 selects the signal (DEVSTEP) applied at the time of existence of the timing deviation or the signal (TRSTEP) applied at the time of the absence of the timing deviation, depending on the timing deviation index signal, at the multiplexer (MUX) 307a to output the final lock step signal to the timing lock detector 200.

The signal (DEVSTEP) is a signal designating the final lock step through the lock control signal of the lock detector 200 so that the final lock step is not more than a predetermined step since the timing deviation is generated. The signal (TRSTEP) is a signal for allowing the lock step to be performed by a lock detection algorithm since the timing deviation is not generated.

The final lock step signal is used as a control signal of the lock step selection of the timing lock detector 200 to select the lock step in the gain selector 103.

An internal construction of the gain selector is illustrated in FIG. 10, and is described with reference to FIG. 10 in the following.

As earlier described in FIG. 10, the gain selector includes the gain setting unit 103a for receiving the timing error signal from the timing error detector 101 to multiply the received error signal by the gain depending on each of the steps; and the multiplexer (MUX) 103b for selecting an appropriate loop gain among values of the gain setting unit 103a by the lock step control signal (step_mode) outputted from the lock controller 207b.

In other words, if the timing lock detector 200 selects and inputs the lock step to the gain selector 103, the gain selector 103 operates to multiply the inputted lock step by the gain depending on the step, thereby determining and outputting the loop bandwidth.

At this time, the final lock step signal is generated at the timing deviation detector 300, the signal selected in the multiplexer 103b is limited to a predetermined step. That is, depending on the existence or absence of the timing deviation, the final lock step signal is allowed to select an optimal final gain of the timing error, thereby optimizing a symbol recovery performance.

Figure 13:
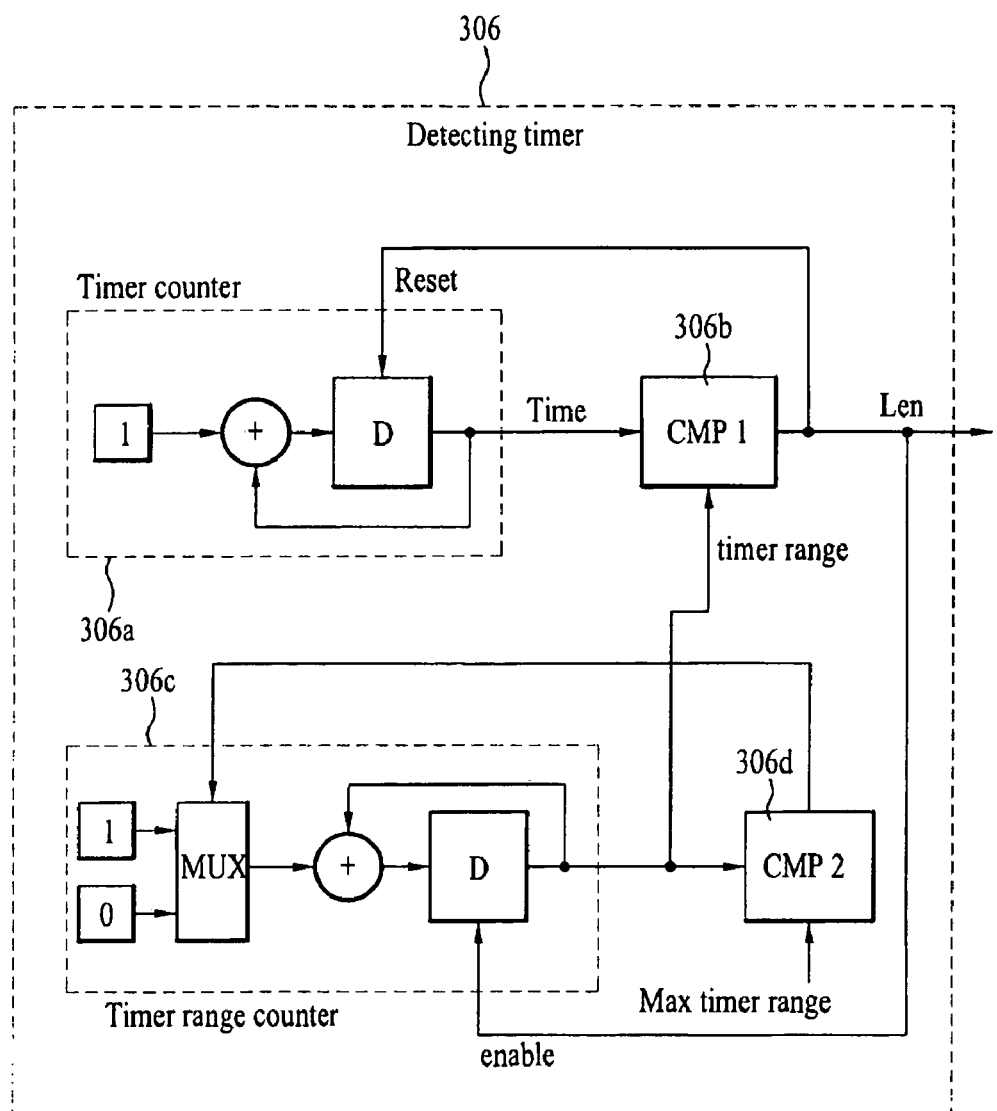
FIG. 13 is a block diagram illustrating a construction of a detecting timer for detecting a timing deviation while a detecting time is gradually increased.

Alternatively, FIG. 13 is a block diagram illustrating a construction of the detecting timer for detecting the timing deviation while the detecting time is gradually increased.

As shown in FIG. 13, the detecting timer 306 is mainly comprised of a timer counter 306a; a comparator1 306b; a timer range counter 306c; and a comparator2 306d.

If a maximal timer range value is inputted to the comparator2 306d, the maximal timer range value is compared with a value increased in the timer range counter 306c. As a compared result, if the increased value is more than the inputted maximal timer range value, the detecting timer 306 operates to no longer increase the timer range.

At this time, the increased counter range value is inputted to the comparator1 306b, and the comparator1 306b allows the count value of the timer counter 306a to increase during the counter range value.

In other words, as a comparative result of the comparator1 306b, if the counter range value is the same as the timer count value, the timer counter 306a is reset to count the timer up to a next counter range, and output the signal (Len) at a high level.

The signal (Len) functions as an operation signal of an internal delay of the timer range counter 306c to provide a timer range corresponding to a next range.

In the above operation of the detecting timer 306, the timer counter 306a perform the count during the timer range provided by the timer range counter 306c, to output time information. The construction of the detecting timer 306 is not limited to the embodiment of the present invention.

Figure 14:
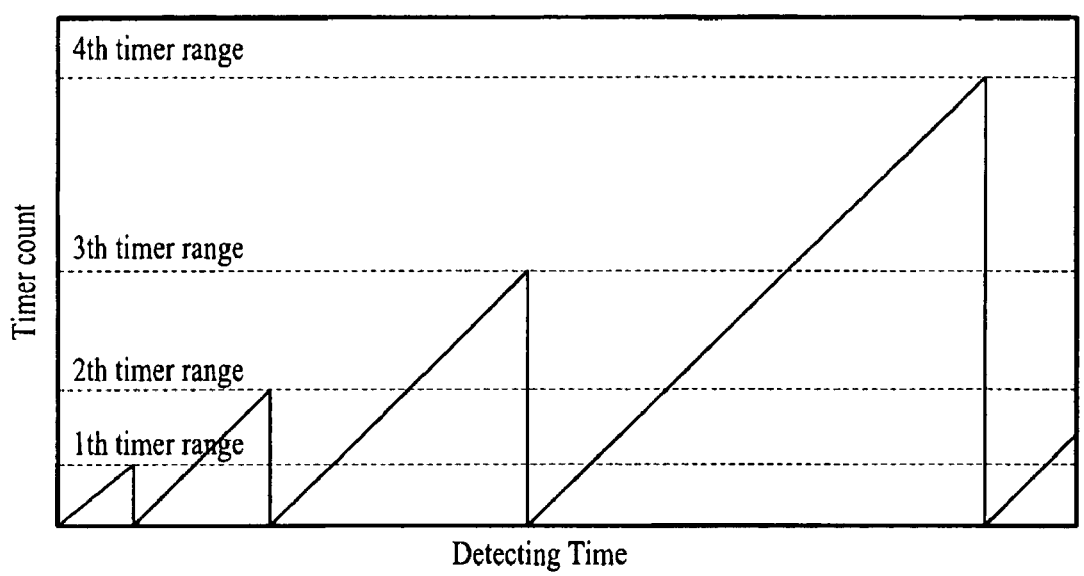
FIG. 14 is a view illustrating an operation signal state of a detecting timer according to the present invention.

FIG. 14 illustrates an operation signal state of the detecting timer according to the present invention.

As shown in FIG. 14, the detecting time increases during the increasing timer range ($1_{st}$ timer range, $2_{nd}$ timer range, ... ). The detecting timer 306 is reset when the increasing detecting time is the same as the timer range value, and the detecting time is again repeated while the detecting time is stepwise increased.

As such, when the timer deviation is detected, the detecting timer 306 is used to gradually increase the detecting time without the fixed detecting time so that the fast timing deviation is detected not to reduce a convergence speed of a whole receiver.

Alternatively, the present invention is applicable to a communication field such as VSB/QPSK/QAM receiver.

An effect of the timing recovery apparatus and method according to the present invention is described as follows.

First, the unit jitter power value and the average DC power value calculated depending on the channel state is used without using the fixed reference value, thereby preventing the lock detecting error and the faster and accurate convergence characteristic.

Second, the timing lock detector can not only singly perform the timing recovery, but also prevent the lock detecting error in association with the channel state estimator and perform the fast lock process.

Third, the timing lock detector has the reliability counter, to stepwise select an appropriate loop bandwidth depending on the channel state.

Fourth, an integrator is used in a window way to be embodied as a minimal hardware.

Fifth, the timing deviation detector is applied to automatically select the optimal final gain of the timing error depending on the existence or absence of the timing deviation, thereby optimizing the symbol recovery performance of the whole receiver.

Sixth, when the timer deviation is detected, the detecting timer is used to gradually increase the detecting time without the fixed detecting time so that the fast timing deviation is detected not to reduce a convergence speed of a whole receiver.

Seventh, the single timing deviation detector is designed to have two threshold values for the reliability and the stability to improve the reliability and the stability.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A timing recovery apparatus comprising:
    a symbol synchronizer for determining a bandwidth of a timing recovery loop by a lock step control signal, which is outputted based on a convergence degree;
    a timing lock detector for determining the convergence degree to generate the lock step control signal; and
    a timing deviation detector for receiving a timing frequency signal outputted from the symbol synchronizer to detect a timing deviation and determining a final value of a timing error gain based on presence or absence of the timing deviation to output the determined final value to the timing lock detector.

2. The apparatus of claim 1, wherein the symbol synchronizer comprises:
    a timing error detector for receiving a reception signal to detect a the timing error;
    a gain selector for receiving the timing error value and the lock step control signal to determine a timing recovery loop bandwidth;
    a loop filter for accumulating and correcting the detected error value based on the determined bandwidth; and
    an oscillator for outputting a sampling frequency based on the corrected value.

3. The apparatus of claim 2, wherein the gain selector comprises:
  a gain setting unit performing a plurality of steps, for receiving a timing error value from the timing error detector to multiply the received error value by a gain based on each of the plurality of steps; and
  a multiplexer for selecting one of loop gains of the gain setting unit by the lock step control signal.

4. The apparatus of claim 3, wherein the timing lock detector comprises:
  an average DC (Direct Current) power calculator for calculating an average DC power of the timing error value;
  a unit jitter power calculator for calculating a unit jitter power of the timing error value;
  a lock/unlock count signal generator for comparing the average DC power with the unit jitter power to generate a lock/unlock count signal;
  a reliability counter for receiving the lock/unlock count signal to count up to a threshold value, thereby generating a lock/unlock signal; and
  a lock controller for generating the lock step control signal by using the lock/unlock signal.

5. The apparatus of claim 4, wherein the reliability counter comprises:
  a counter for increasing or decreasing a count value based on the lock/unlock count signal; and
  a comparator for comparing the count value, increasing or decreasing through the counter, with the threshold value.

6. The apparatus of claim 5, wherein the reliability counter comprises a memory for storing a preset and inputted lock threshold value and unlock threshold value.

7. The apparatus of claim 6, wherein the reliability counter performs a gear shifting based on the lock/unlock count signal.

8. The apparatus of claim 4, wherein the lock controller has a lock step as much as a gain step of the gain selector, and comprises a lock state counter for increasing or decreasing the lock step based on the inputted lock/unlock signal.

9. The apparatus of claim 4, wherein the timing lock detector further comprises a channel state estimator for estimating a channel state to generate a channel state condition satisfaction signal if the estimated channel state is larger than a preset channel state.

10. The apparatus of claim 9, wherein the lock controller receives the channel state condition satisfaction signal to generate the lock step control signal and to allow shifting to the final lock step.

11. The apparatus of claim 4, wherein the lock/unlock count signal generator comprises a comparator for comparing the unit jitter power and the average DC power.

12. The apparatus of claim 11 wherein the comparator generates a lock count signal if the unit jitter power is larger than or equal to the average DC power.

13. The apparatus of claim 11 wherein the comparator generates an unlock count signal if the unit jitter power is less than the average DC power.

14. The apparatus of claim 1, wherein the timing deviation detector comprises:
  a timing deviation detection unit for obtaining a deviation of a maximum value and a minimum value of a timing frequency outputted from the symbol synchronizer;
  a threshold selector for providing a preset threshold value;
  a comparing judgment compartment for comparing the obtained timing deviation value with the threshold value to generate a timing deviation index signal; and
  a last timing lock step selector for selecting the final lock step signal based on the timing deviation index signal.

15. The apparatus of claim 14, further comprising a detecting timer for detecting the timing deviation while gradually increasing a detecting time of the timing deviation detection unit.

16. The apparatus of claim 14, wherein the threshold selector comprises:
  a memory for storing at least one threshold value; and
  a multiplexer for selecting one of the stored threshold values.

17. The apparatus of claim 16, wherein the comparing judgment compartment comprises a comparator for comparing the timing deviation value with the threshold value to generate the timing deviation index signal if the deviation value is larger than the threshold value.

18. The apparatus of claim 16, wherein the last timing lock step selector comprises:
  a memory for storing a DEVSTEP signal outputted when the timing deviation is present, and a TRSTEP signal outputted when the timing deviation is absent; and
  a multiplexer for selecting one of the DEVSTEP and TRSTEP signals based on the timing deviation index signal.

19. The apparatus of claim 18, wherein the DEVSTEP signal controls the final lock step to be less than a preset step.

20. The apparatus of claim 18, wherein the TRSTEP signal performs the lock step by a lock detection algorithm of the lock detector.

21. The apparatus of claim 1, wherein the timing deviation detector comprises:
  a maximum value storing unit for storing a maximum value; and
  a minimum value storing unit for storing a minimum value to detect time of an inputted symbol timing information.

22. The apparatus of claim 1, wherein the timing deviation detector automatically selects an optimal final gain of the timing error.

23. A timing recovery method comprising:
  detecting a timing error of a reception signal and determining a convergence degree based on the detected timing error in order to generate a lock step control signal;
  determining a bandwidth of a timing recovery loop based on the lock step control signal;
  receiving a timing frequency signal based on the determined bandwidth in order to detect a timing deviation;
  determining a final value of a timing error gain based on presence or absence of the timing deviation; and
  controlling the lock step based on the determined final value of the timing error gain.

24. The method of claim 23, wherein generating the lock step control signal comprises:
  calculating an average DC (Direct Current) power of the timing error value;
  calculating a unit jitter power of the timing error value;
  comparing the average DC power with the unit jitter power to generate a lock/unlock count signal;
  receiving the lock/unlock count signal to count up to a threshold value, thereby generating a lock/unlock signal; and
  generating the lock step control signal through the lock/unlock signal.

25. The method of claim 24, wherein calculating the average DC power comprises:
  accumulating the timing error generated from every symbol, during an integral duration, and dividing the accumulated timing error by a magnitude of the integral duration to obtain an average DC value; and squaring the average DC value to obtain the average DC power value.

26. The method of claim 24, wherein calculating the unit jitter power comprises:
   obtaining a square value of the timing error generated from every symbol to accumulate the obtained square value during an integral duration, and dividing the accumulated square value by the magnitude of the integral duration to obtain the average jitter power; and
   dividing the average jitter power by number of samples to calculate the unit jitter power.

27. The method of claim 24, wherein generating the lock/unlock count signal comprises generating a lock count signal if the unit jitter power is greater than or equal to the average DC power.

28. The method of claim 24, wherein generating the lock/unlock count signal comprises generating an unlock count signal if the unit jitter power is less than the average DC power.

29. The method of claim 24, wherein generating the lock/unlock signal comprises:
   increasing or decreasing a count value based on the lock/unlock count signal; and
   comparing the increasing or decreasing count value with the threshold value.

30. The method of claim 29, wherein the threshold value is preset and inputted as a lock threshold value and an unlock threshold value.

31. The method of claim 30, wherein the lock signal is generated if the increasing count value is equal to or greater than the lock threshold value.

32. The method of claim 30, wherein the unlock signal is generated if the decreasing count value is less than or equal to the unlock threshold value.

33. The method of claim 30, wherein counting is performed by a gear shifting based on the lock/unlock count signal.

34. The method of claim 24, wherein generating the lock step control signal comprises increasing or decreasing a plurality of loop gain steps based on the inputted lock/unlock signal.

35. The method of claim 23, further comprising estimating a channel state to generate a channel state condition satisfaction signal if the estimated channel state is greater than a preset channel state.

36. The method of claim 35, wherein the lock step control signal is generated to allow shifting to the final lock step based on the channel state condition satisfaction signal.

37. The method of claim 23, wherein determining the bandwidth of the timing recovery loop comprises:
   receiving a timing error value in a plurality of steps to multiply the received error value by a gain based on each of the plurality of steps; and
   selecting one of loop gains of the gain setting unit according to the lock step control signal.

38. The method of claim 23, wherein detecting the timing deviation comprises:
   obtaining a deviation of a maximum value and a minimum value of a timing frequency;
   comparing the deviation value with the threshold value to generate a timing deviation index signal; and
   selecting the final lock step signal based on the timing deviation index signal.

39. The method of claim 38, further comprising stepwise increasing a timing deviation detecting time.

40. The method of claim 38, wherein at least one threshold value is provided.

41. The method of claim 38, wherein the timing deviation value is compared with the threshold value and the timing deviation index signal is generated if the deviation value is greater than the threshold value.

42. The method of claim 41, wherein the final lock step signal is outputted to control the final lock step to be less than a preset step based on the timing deviation index signal.

43. The method of claim 41, wherein if the timing deviation index signal is absent, the lock step is performed by a lock detection algorithm of the lock detector.

* * * * *